(12) United States Patent
Wakui et al.

(10) Patent No.: US 6,484,494 B2
(45) Date of Patent: Nov. 26, 2002

(54) ELECTRONIC CONTROL UNIT FOR CONTROLLING AIR FUEL RATIO TO REDUCE NOX OCCLUDED IN NOX CATALYST

(75) Inventors: Masayuki Wakui, Wako (JP); Minoru Shimaoka, Wako (JP); Wataru Inagawa, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/975,314

(22) Filed: Oct. 12, 2001

(65) Prior Publication Data

US 2002/0056271 A1 May 16, 2002

(30) Foreign Application Priority Data

Oct. 25, 2000 (JP) ........................................ 2000-325164

(51) Int. Cl.[7] ................................................. F01N 3/00
(52) U.S. Cl. .............................. 60/285; 60/274; 60/276; 60/295; 60/301
(58) Field of Search ........................... 60/285, 295, 297, 60/299, 301, 274, 276

(56) References Cited

U.S. PATENT DOCUMENTS

| | | | | |
|---|---|---|---|---|
| 5,953,907 A | * | 9/1999 | Kato et al. ..................... | 60/277 |
| 5,956,948 A | * | 9/1999 | Nagashima et al. ........... | 60/277 |
| 5,992,144 A | * | 11/1999 | Takanohashi et al. .......... | 60/285 |
| 6,085,518 A | * | 7/2000 | Yamashita et al. ............. | 60/274 |
| 6,116,023 A | * | 9/2000 | Ishizuka et al. ............... | 60/285 |
| 6,195,987 B1 | * | 3/2001 | Miyashita ...................... | 60/285 |
| 6,209,316 B1 | * | 4/2001 | Duvinage et al. .............. | 60/285 |
| 6,244,046 B1 | * | 6/2001 | Yamashita ..................... | 60/285 |
| 6,309,536 B1 | * | 10/2001 | Inagaki et al. ................. | 60/277 |
| 6,336,320 B1 | * | 1/2002 | Tanaka et al. ................. | 60/277 |

FOREIGN PATENT DOCUMENTS

| | | |
|---|---|---|
| JP | 7-139340 | 5/1995 |
| JP | 11-6421 | 1/1999 |

* cited by examiner

Primary Examiner—Thomas Denion
Assistant Examiner—Diem Tran
(74) Attorney, Agent, or Firm—Arent Fox Kintner Plotkin & Kahn, PLLC (57) ABSTRACT

An electronic control unit controls an air/fuel ratio of an engine having a lean NOx catalyst in its exhaust system in order to improve the cleaning of exhaust gas during rich process to reduce lean NOx catalyst. The electronic control unit includes an estimator for estimating NOx amount occluded in the lean NOx catalyst; a device for performing shift-to-rich process responsive to the NOx amount estimated by said estimator exceeding a predetermined value; a calculator for calculating an accumulated value of an exhaust flow amount; and a device for completing the shift-to-rich process responsive to the accumulated value of the exhaust flow amount exceeding a threshold value. Completing the shift-to-rich process using the accumulated value of the exhaust flow amount enables the NOx occluded in the lean NOx catalyst to be precisely reduced.

16 Claims, 6 Drawing Sheets

ELECTRONIC CONTROL UNIT FOR CONTROLLING AIR FUEL RATIO TO REDUCE NOX OCCLUDED IN NOX CATALYST

TECHNICAL FIELD

The present invention relates to cleaning exhaust gas of an automobile engine, in particular, to air-fuel ratio control on an automobile equipped with a lean NOx catalyst.

BACKGROUND OF THE INVENTION

In engines burning fuel at lean side of an air-fuel ratio (hereinafter referred to as a lean-burn engine), a lean NOx catalyst (LNC) is employed to occlude NOx exhausted at lean air-fuel ratio and to reduce the occluded NOx at rich or theoretical air-fuel ratio. Since the amount of NOx that the lean NOx catalyst can occlude is limited, the engine cannot continue the lean-burn operation for a long time. To continue the lean-burn operation for a long time, the air-fuel ratio need to be changed temporarily to rich side to reduce the NOx occluded in the lean NOx catalyst during the lean-burn operation, causing the catalyst to release the occluded NOx. This process is referred to as "shift-to-rich process".

It is well known in the art to perform the shift-to-rich process periodically during the lean-burn operation to actively reduce the NOx occluded in the LNC, and to perform the shift-to-rich process on transition from the lean-burn operation to stoichiometric air-fuel ratio operation (hereinafter referred to as "stoichiometric operation") to reduce the NOx occluded in the LNC. It is also known to estimate the amount of the NOx occluded in the LNC in order to vary the air-fuel rich amount according to the estimated amount, one example of which is disclosed in The Japanese Laid-Open Patent Application No. 7-139340.

According to this application, it is disclosed to provide a NOx estimating counter for estimating the amount of NOx occluded in the LNC. This counter is incremented during the lean-burn operation and is decremented while performing the shift-to-rich process or during the stoichiometric operation. More specifically, a value depending on operation state of the engine is added to the NOx estimating counter at every certain period during the lean-burn operation. A value depending on the fuel amount exceedingly fed to the engine is subtracted from the counter at every certain period while performing the shift-to-rich process or during the stoichiometric operation.

The Japanese Laid-Open Patent Application No. 11-6421 describes other technique which comprises means for determining a saturation state of NOx amount occluded in the NOx catalyst to adequately change the rich amount of the air-fuel ratio, causing the shift-to-rich process to be initiated with appropriate timing. More specifically, this technique includes a calculator for calculating the amount of NOx generated in the engine in accordance with a detected value of internal pressure in cylinder of the engine. When the calculated amount is determined as saturation state of NOx occluded in the NOx catalyst, the shift-to-rich process is initiated. Predetermined period according to engine speed is set in a timer and shift-to-rich process is performed during this set period.

In the above-mentioned conventional technique, however, the period for the shift-to-rich process is set according to the engine speed and therefore the shift-to-rich process is not adapted appropriately to the change of engine load. More specifically, in the shift-to-rich process when the lean NOx catalyst is saturated, sufficient CO and HC have to be supplied to the lean NOx catalyst enough to reduce the occluded NOx. However, setting the period according to only the engine speed, it is probable that the amount of reducing agent (HC, CO) becomes short and can not reduce all of the NOx or the amount of reducing agent becomes too much and may degrade exhaust performance. Moreover, in the case that a three-way catalyst is provided upstream of the lean NOx catalyst, the reducing agent may become short because the reducing agent is oxidized by the three-way catalyst during the shift-to-rich process, as in the case of the air-fuel ratio changing from lean side to stoichiometry.

Considering the above-mentioned problems, it is objective of the invention to provide an electronic control unit for cutting the emission as well as improving the drivability by appropriately controlling the shift-to-rich process for reducing the NOx occluded in the lean NOx catalyst during the shift-to-rich process and transition from the lean operation to the stoichiometric operation.

SUMMARY OF THE INVENTION

To solve the above-mentioned problems, according to one aspect of the invention, an electronic control unit is provided which controls an air-fuel ratio of an engine having a lean NOx catalyst in its exhaust system, comprising: an estimator for estimating NOx amount occluded in the lean NOx catalyst; means for performing shift-to-rich process responsive to the NOx amount estimated by said estimator exceeding a predetermined value; a calculator for calculating an accumulated value of an exhaust flow amount; and means for completing said shift-to-rich process responsive to said accumulated value of the exhaust flow amount exceeding a threshold value.

Completing the shift-to-rich process based on the accumulated value of the exhaust flow amount, which is correlated with the amount of the reducing agent (HC, CO), enables the NOx occluded in the lean NOx catalyst to be precisely reduced, and resultingly the exhaust gas can be cleaned at higher level.

According to second aspect of the invention, an electronic control unit is provided for controlling an air-fuel ratio of an engine having a lean NOx catalyst in its exhaust system, comprising: an estimator for estimating NOx amount occluded in the lean NOx catalyst; means for performing shift-to-rich process on a transition from lean-burn operation to stoichiometric operation; a calculator for calculating an accumulated value of an exhaust flow amount; and means for completing said shift-to-rich process responsive to said accumulated value of the exhaust flow amount reaching a threshold value which is set based on the occluded NOx amount estimated by said estimator.

On the transition from the lean-burn operation to the stoichiometric operation, the shift-to-rich process is performed to reduce the lean NOx catalyst and the timing for completing the shift-to-rich process is determined based on the accumulated value of the exhaust flow amount and the estimated amount of the occluded NOx, enabling the NOx occluded in the lean NOx catalyst to be precisely reduced and resultingly the exhaust gas is cleaned at higher level.

According to third aspect of the invention, said electronic control unit further comprises a three-way catalyst and an air-fuel ratio sensor upstream of said lean NOx catalyst, wherein said calculating means starts to accumulate the exhaust flow amount when said air-fuel ratio sensor indicates rich.

Since the accumulation of the exhaust flow amount is started when the air fuel ratio sensor upstream of the lean NOx catalyst indicates rich, the effect of degradation of the three-way catalyst placed upstream of the sensor may be avoided and the NOx occluded in the lean NOx catalyst may be reduced appropriately.

According to fourth aspect of the invention, said electronic control unit further comprises adding means for adding NOx amount to be occluded in said lean NOx catalyst during said shift-to-rich process, to said estimated occluded NOx amount.

It is possible to reduce the NOx occluded in the lean NOx catalyst on the transition from the lean-burn operation to the stoichiometric operation.

DETAILED DESCRIPTION OF THE PREFERRED EMBODIMENTS

Figure 1:
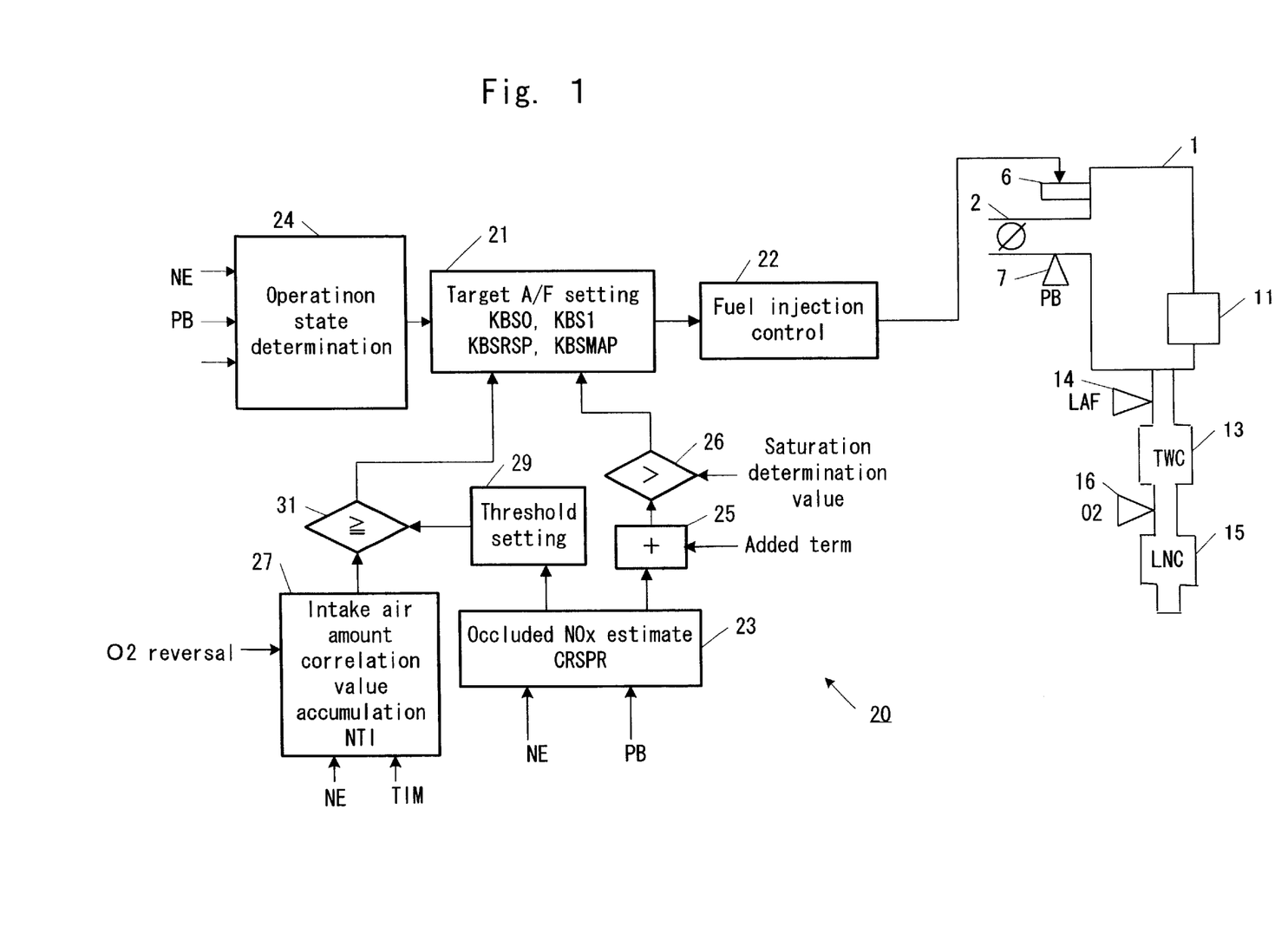
FIG. 1 is a block diagram illustrating the structure of an engine, an exhaust gas cleaning unit and an electronic control unit in accordance with one embodiment of the present invention.

Now one preferred embodiment of the invention will be described referring to the attached drawings. FIG. 1 illustrates the structure of an engine to which the invention is applied. As shown in FIG. 1, an engine 1 comprises an air intake pipe 2, a fuel injector 6, sensors 11 and an exhaust system. With the intake pipe 2 is provide a pressure sensor 7 for detecting pressure within the air intake pipe (PB), which is converted to electrical signal by the pressure sensor 7 to be supplied to an electronic control unit (hereinafter referred to as ECU) 20.

The sensors 11 include an engine revolution (NE) sensor, which generates a signal pulse (TDC pulse) at a predetermined crank angle position of the crankshafts of the engine 1 and sends to ECU 20 the signal according to the engine revolution. The sensors 11 generally represent a plural of sensors including some other sensors such as the engine water temperature sensor.

A three-way catalyst (hereinafter referred to as TWC) 13 for cleaning HC, CO and NOx is provided in the exhaust system. Downstream of the TWC 13, a lean NOx catalyst (LNC) 15 for occluding the NOx is provided in series. The LNC 15 occludes the NOx generated during lean operation and then the occluded NOx will be reduced by HC and CO, contained in exhaust gas, to release N2 during rich operation. Upstream of the TWC 13, a linear A/F (LAF) sensor 14 is provided, which outputs an electric signal almost proportional to an air/fuel ratio. Between the TWC 13 and the LNC 15, there is provided an O2 sensor 16, which outputs an electric signal changing its voltage level extremely between rich side and lean side across the theoretical air-fuel ratio. Signals from these sensors are supplied to the ECU 20.

The electronic control unit ECU 20 is implemented in a computer, which comprises read-only memory (ROM) for storing programs to be executed on CPU and data to be used with the programs, random access memory (RAM) for storing retrieved programs and data and providing work areas for computing, a central processing unit (CPU) for executing the programs, a processing circuit for processing input signals from various sensors and a driving circuit for sending control signals to each engine element. Based on such hardware configuration, FIG. 1 illustrates the ECU20 with functional blocks.

General Functionality of the Electronic Control Unit

An occluded NOx estimate block 23 receives the intake pipe pressure PB from the sensor 7 and the engine revolution NE from the sensors 11 and then estimates the amount of the NOx occluded in the lean NOx catalyst 15 based on the received PB and NE.

During the lean-burn operation, an adding block 25 assumes a possible NOx amount that should be occluded during the shift-to-rich process. The adding block 25 then adds such assumed amount to the occluded NOx amount that has been previously estimated by the occluded NOx estimate block 23 to obtain a sum value. The obtained sum value is compared with a predetermined saturation value by a determination block 26. If the determination block 26 determines that the sum value of the occluded NOx amount exceeds the predetermined value, it will set a shift-to-rich permission flag F-RSPOK to 1. In response to this set, a target air/fuel ratio setting block 21 set an air/fuel ratio to a shift-to-rich process target air/fuel ratio KBSRSP. In one embodiment, the shift-to-rich process target air/fuel ratio is 13.0 for example. The reason the adding block 25 adds the NOx amount that should be occluded during the shift-to-rich process is as follows: Even during the shift-to-rich process, some amount of NOx may be occluded in the lean NOx catalyst 15. So, by determining the transition to the shift-to-rich based on the sum of such probable amount to the estimated amount of the occluded NOx, it is possible to prevent the NOx generated during the shift-to-rich process from being released into the air without being occluded in the lean NOx catalyst 15.

An operation state determination block 24 determines the operation state of the concerned automobile based on such parameters as the engine revolution, the air intake pipe pressure, and an accelerator opening degree. The operation state determination block 24 then determines a transition between a lean-burn operation mode and a stoichiometric operation mode and sends an corresponding signal to a target air/fuel ratio setting block 21.

When the target air/fuel ratio setting block 21 receives, from the operation determination block 24, the signal indicating the transition from the lean-burn operation to the stoichiometric operation (hereinafter referred to as "transition from lean to stoichiometry), it performs a process for setting the air/fuel ratio from a theoretical value to a rich value so that the NOx occluded in the lean NOx catalyst 15 during the lean-burn operation could be reduced and accordingly the lean NOx catalyst 15 could recover its functionality. This process is called "a rich process on the transition to stoichiometry". In one embodiment, the target air/fuel ratio setting block 21 may set a target air/fuel ratio KBS1 on the transition from lean to stoichiometry to 13.0 for example. In this case, the adding block 25 adds the amount of NOx that is assumed to be occluded during the rich process on the transition to stoichiometry to the occluded NOx amount that has been estimated by the occluded NOx estimate block 23. This resulting value will be used as a threshold by a threshold value setting block 29 to determine a completion of the rich process.

An intake air amount correlation value accumulation block 27 starts to accumulate an intake air amount correlation value NTI when it receives a reverse signal from the O2 sensor 16 (indicating that the air/fuel ratio of the exhaust gas flowing into the lean NOx catalyst 15 changes from the lean side to the rich side). Since the amount of the intake air has a correlation with the amount of reducing gases (HC and CO), the accumulated amount of the intake air accumulated since the air/fuel ratio of the exhaust gas changes from the lean side to the rich side has a correlation with the progress of reducing the NOx occluded by the lean NOx catalyst 15. When the accumulated intake air amount correlation value accumulated by the accumulation block 27 reaches the threshold value set by the threshold value setting block 29, a reduction completion decision block 31 decides to complete the reduction process and send a corresponding signal to the target air/fuel ratio setting block 21.

The threshold value setting block 29 sets a fixed value as a threshold value during the shift-to-rich process in the lean-burn operation. During the rich process on the transition from lean to stoichiometry, the threshold value setting block 29 obtains a corresponding threshold value by searching a table based on the sum value that is obtained by adding the amount of NOx that is assumed to be occluded during the rich process on the transition to stoichiometry to the occluded NOx amount that has been estimated by the occluded NOx estimate block 23.

A fuel injection control block 22 calculates a fuel injection pulse width Tout by a following equation using the established target air/fuel ratio, and drives the fuel injection unit 6:

$$Tout = TIM * Kcyl + TiVb \quad (1)$$

where TIM represents a basic fuel injection width, Kcyl represents a fuel correction term and TiVb represents an invalid fuel injection width. Appropriate values are preselected for TIM and TiVb. The fuel correction term is calculated by a following equation:

$$Kcyl = KCMD * KAF \quad (2)$$

where KCMD represents a feed-forward (F/F) correction term, which is to be determined with the basic target air/fuel ratio KBS and the shift-to-rich process target air/fuel ratio KBSRSP depending on the operational conditions. KAF is a feedback (F/B) correction term. ECU 20 executes the air/fuel ratio feedback with KCMD as its target.

Figure 2:
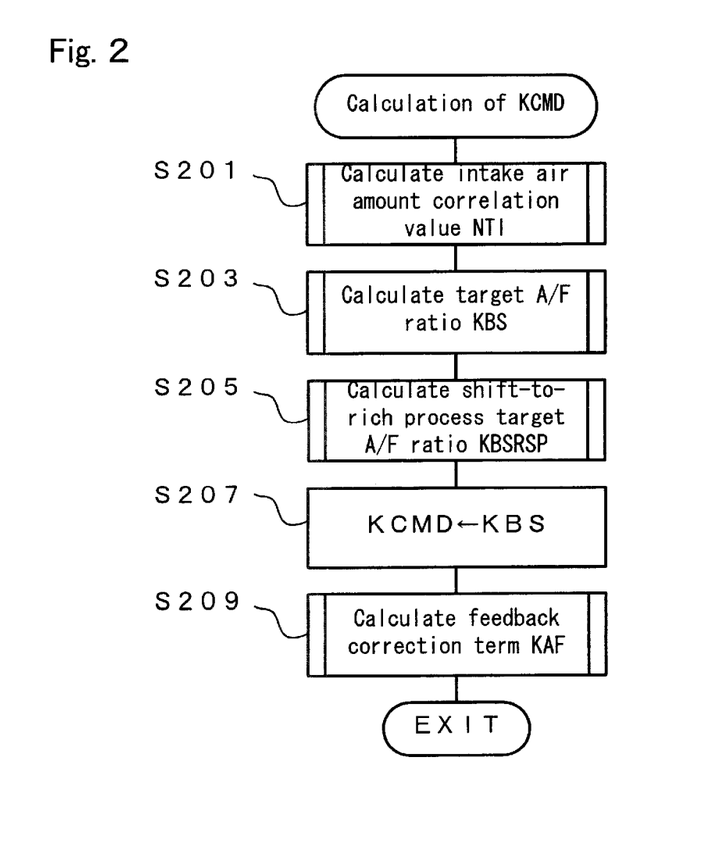
FIG. 2 is a flow chart of the process for calculating a feedback target of an air-fuel ratio.

FIG. 2 is a flow chart illustrating a process for calculating the F/F correction term KCMD, which is executed with each TDC pulse. First the intake air amount correlation value is calculated by means of another process that will be described later with reference to FIG. 3 (S201), and then the basic target air/fuel ratio KBS is calculated by means of a basic target air/fuel ratio calculation process depending on the operational conditions, which will be also described later in conjunction with FIG. 6 (S203). The shift-to-rich process target air/fuel ratio KBSRSP is calculated by means of a shift-to-rich process coefficient calculation process that will be explained later with reference to FIG. 7 (S205). KBS is set to KCMD (S207) and the F/B correction term KAF is calculated by means of the feedback control computing (S209). Thus, the injection correction term Kcyl based on the air/fuel ratio is calculated, which is required for calculating the fuel injection pulse width Tout.

Accumulation of Exhaust Gas Flow Amount

Figure 3:
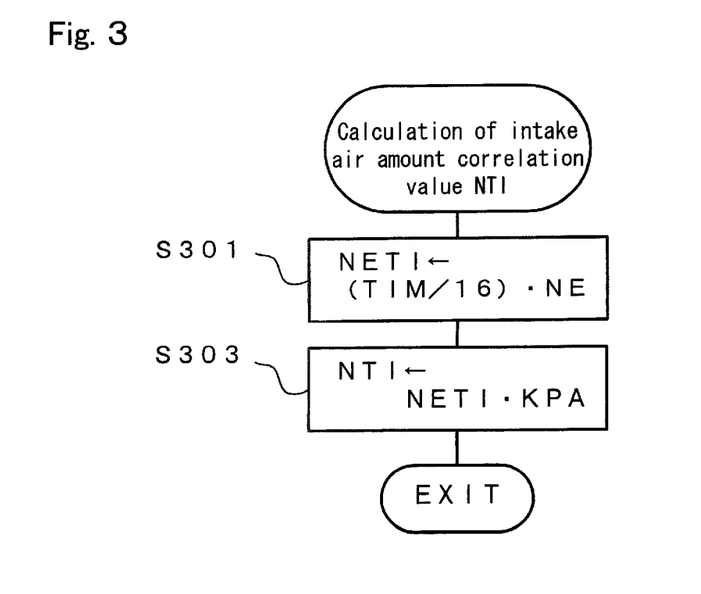
FIG. 3 is a flow chart of the process for calculating an intake air amount correlation value.

FIG. 3 is a flow chart illustrating a process for calculating the intake air amount correlation value NTI, which is performed in step S201 of FIG. 2. At step S301 of FIG. 3, NETI is calculated by multiplying $\frac{1}{16}$ of the basic fuel injection width TIM by the engine revolution NE. Then NTI is calculated by multiplying NETI by an air pressure correction term KPA that is to be determined based on an air pressure detected by an air pressure sensor (S303). Instead of calculating the intake air amount, the actually measured amount may be alternatively used as the intake air amount.

Figure 4:
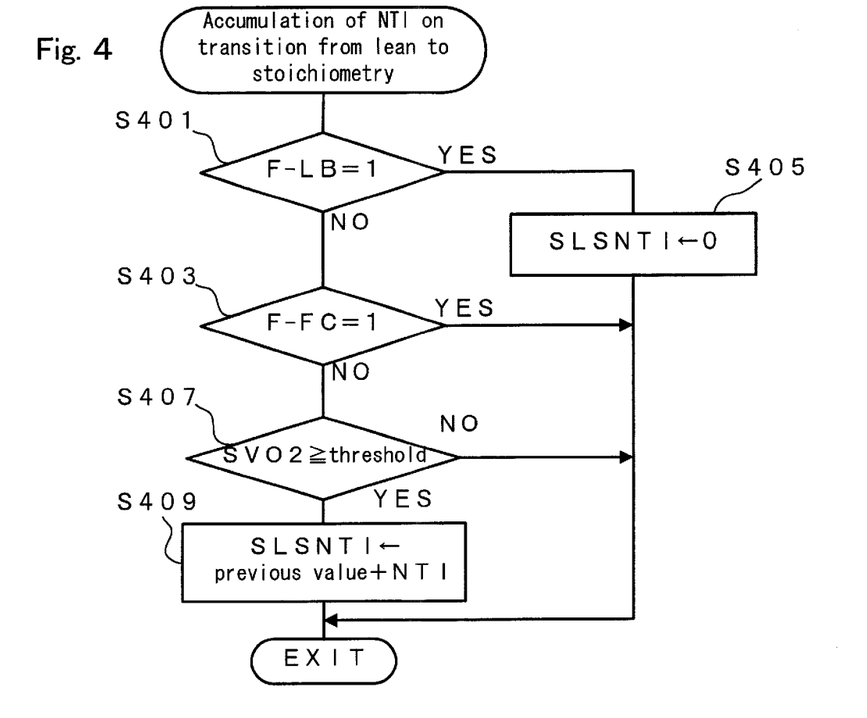
FIG. 4 is a flow chart of the process for calculating an accumulated value of an intake air amount during rich process on a transition from a lean operation to a stoichiometric operation.
Figure 5:
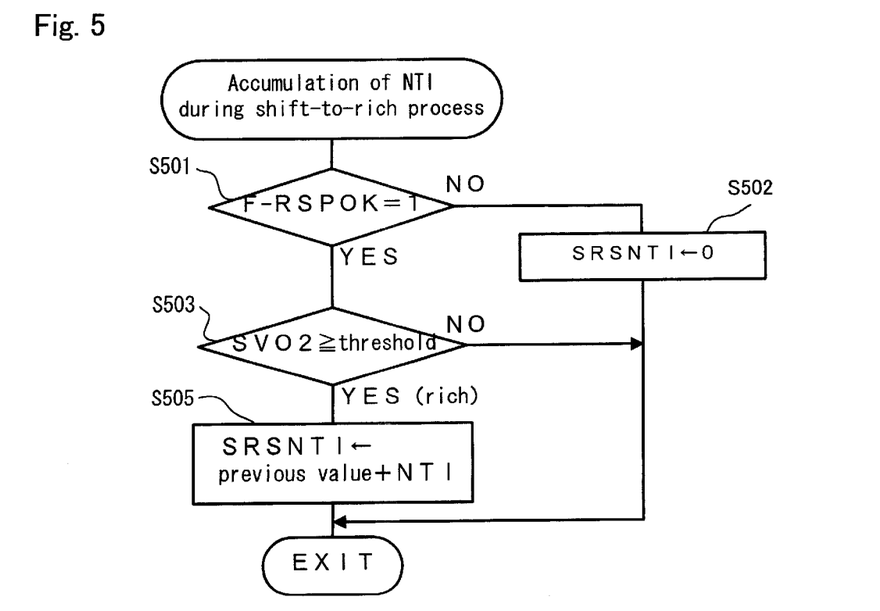
FIG. 5 is a flow chart of the process for calculating an intake air amount correlation value during the shift-to-rich process.

In embodiments of the invention, an accumulated value of an intake air amount correlation value is used as an accumulated value of the exhaust flow amount. The intake air amount correlation value accumulation block 27 of FIG. 1 performs this accumulation. FIG. 4 shows a flow chart for accumulating the intake air amount correlation value NTI when the rich process of the air-fuel ratio is performed on the transition form the lean-burn operation to the stoichiometric operation. FIG. 5 shows a flow chart for accumulating the intake air amount correlation value NTI when the shift-to-rich process is performed during the lean-burn operation.

Now referring to FIG. 4, it is determined based on a lean-burn permission flag F-LB whether the lean burn operation is permitted or not (S401). If the lean-burn operation is permitted, the accumulated value SLSNTI is set to zero (S405) because there is no need to obtain the accumulated value. If the lean-burn operation is not permitted, it is determined whether a fuel cut operation is executed or not (S403). If the fuel cut operation is executed, this process is terminated. Otherwise, it is determined whether the output of the O2 sensor 16 (SV02) is equal to or more than a predetermined threshold value, in other words, whether the air-fuel ratio has been reversed from the lean side to the rich side (S407). If the air-fuel ratio has not been reversed, this process is terminated. If the air-fuel ratio has been reversed to rich side, the NTI calculated by the process of FIG. 3 is added to the previous accumulated value to calculate current accumulated value SLSNTI (S409). This accumulated value is used for determining the completion of the rich process at step S627 of FIG. 6.

Processes of FIG. 4 and FIG. 5 are executed in constant cycle, for example, every 100 milliseconds.

FIG. 5 is a flow chart illustrating a process for calculating an accumulated value SRSNTI of the NTI when the shift-to-rich process is performed during the lean-burn operation. First, the process determines whether the shift-to-rich process permission flag F-RSPOK is set to 1 or not (S501). If not, the process sets the accumulated value SRSNTI to zero (S505). If the flag is set to 1, the process determines whether the output SVO2 of the O2 sensor 16 exceeds a predetermined threshold value or not, in other words, whether the air/fuel ratio has been reversed from the lean side to the rich side (S503). If the air-fuel ratio has not been reversed, the process is terminated. If the air/fuel ratio has been reversed, NTI calculated through the process of FIG. 3 is added to the previous accumulated value to produce the current accumulated value SRSNTI (S507). This current accumulated value will be used to determine the completion of the shift-to-rich process in step S719 of FIG. 7.

Calculation of Basic Target Air-Fuel Ratio KBS

Figure 6:
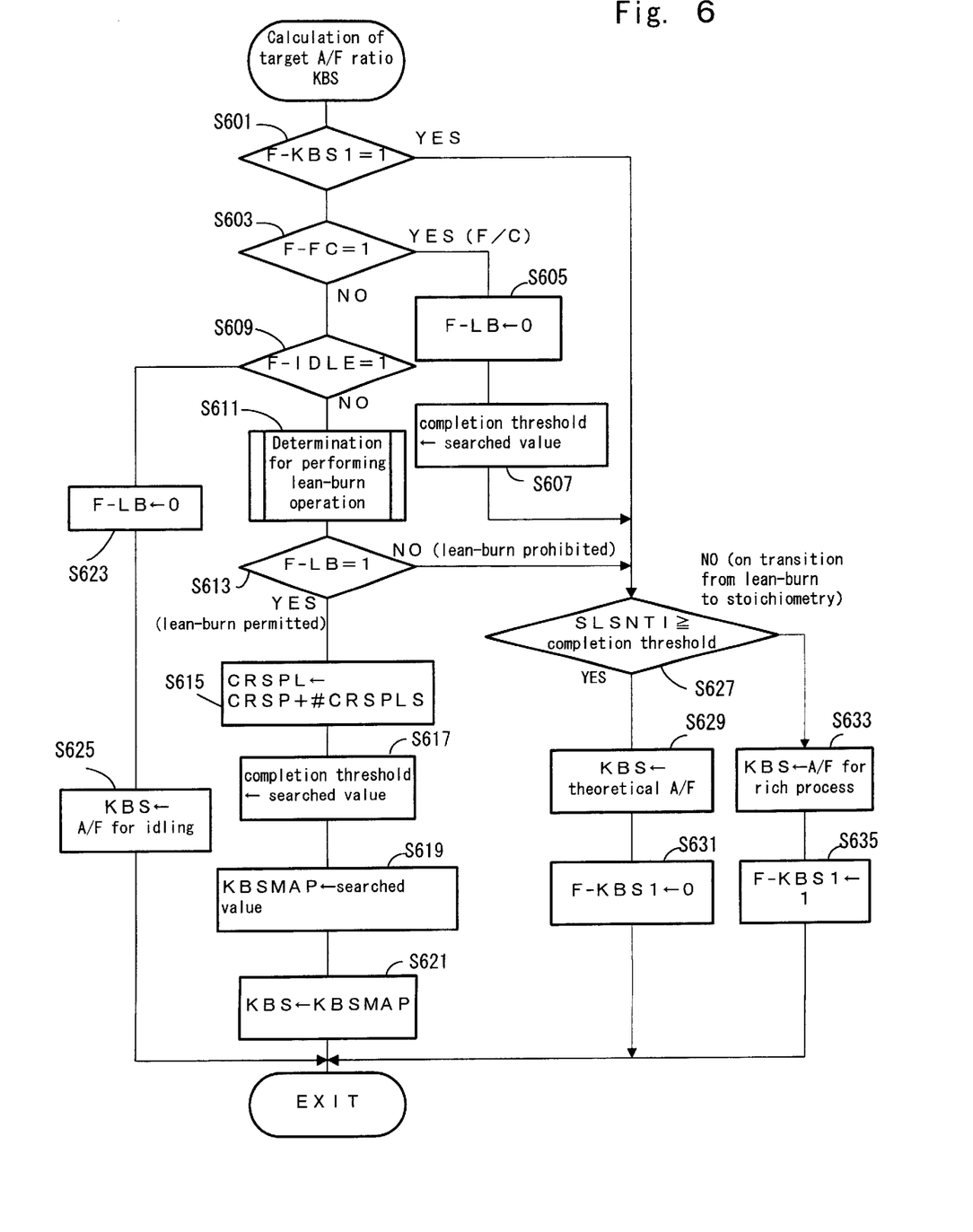
FIG. 6 is a flow chart of the process for calculating a target air-fuel ratio.

FIG. 6 illustrates a flow chart for calculating the basic target air-fuel ratio KBS at step S203 of FIG. 2. A flag F-KBS1 indicates that the rich process on transition from the lean-burn operation to the stoichiometric operation is in progress, and indicates the target air-fuel ratio is a rich air-fuel ratio KBS1 (for example, 13.0). If this flag is not 1, it is determined whether the fuel cut operation is in progress (S603). If the fuel cut operation is not in progress, it is determined whether an idling operation is in progress (S609).

Then it is determined whether the lean-burn operation can be performed (S611). If the lean-burn operation is permitted, the flag F-LB is set to 1. It is determined whether the flag F-LB, which indicates to permit the lean-burn operation, is 1 or not (S613). If the answer is YES, the target air-fuel ratio (KBSMAP) during the lean-burn operation is calculated in S615 and subsequent steps.

Figure 8:
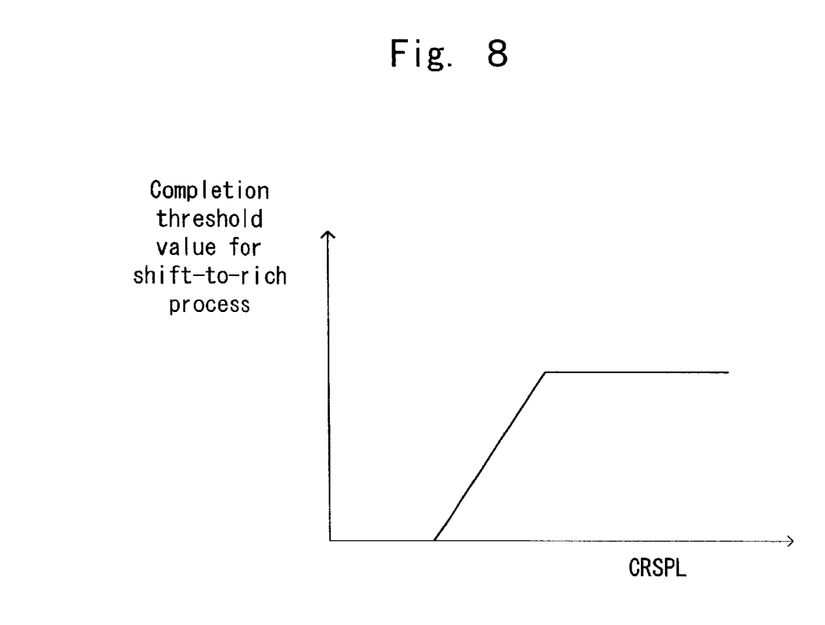
FIG. 8 is a drawing of a table for retrieving a completion threshold value for shift-to-rich process with CRSPL in step S617.

The amount of NOx occluded on the transition from lean to stoichiometry CRSPLS is added to occluded NOx estimate value CRSP to obtain a occluded NOx estimation value CRSPL (S615). A table shown in FIG. 8 is retrieved with this CRSPL and the retrieved value is set to a threshold value to the accumulated value of exhaust flow amount (the intake air amount correlation value) to determine the completion of the rich process on the transition from lean to stoichiometry (S617). This threshold value is used at step S627 later.

A predetermined map is searched with the engine speed NE and the air intake pipe pressure PB as parameters to obtain a target air-fuel ratio KBSMAP during the lean-burn process (S619). This KBSMAP is set to the basic target air-fuel ratio KBS (S621).

Figure 9:
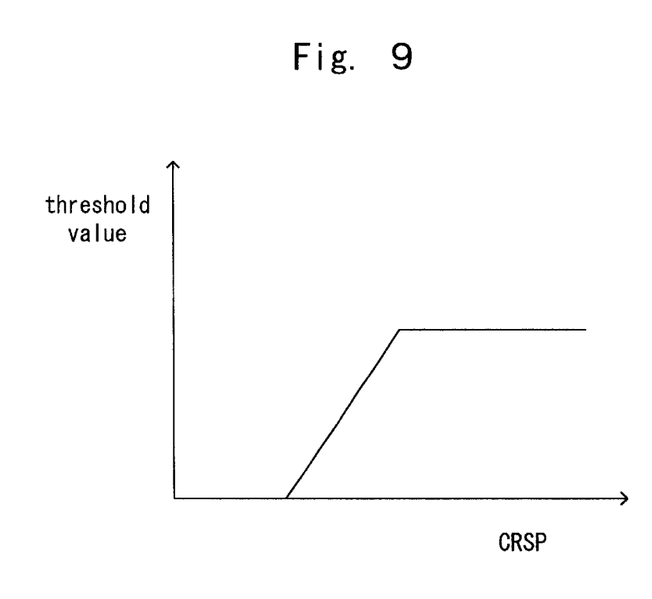
FIG. 9 is a drawing of a table for retrieving a completion threshold value for shift-to-rich process with CRSP in step S607.

If the flag F-KBS1 is set to 1 at step S601, or the lean-burn permission flag is not 1 (indicating the lean-burn operation is prohibited) at step S613, the process moves to step S627 to determine the completion of the rich process. If it is determined that the fuel cut operation is in progress at step S603, the lean-burn permission flag F-LB is set to zero (S605). A table shown in FIG. 9 is then searched in the same manner as step S627 to obtain rich process completion threshold value (S607). The process moves to step S627 to determine the completion of the rich process. When returning from the fuel cut operation, there are almost no NOx occluded in lean NOx catalyst and so the table search is done based on the estimated value CRSP.

If the accumulated value SLSNTI has not exceeded the completion threshold value at step S627, target air-fuel ratio KBS1 for rich process on the transition from lean to stoichiometry is set to the target air-fuel ratio KBS (S633), and the flag F-KBS1 is set to 1 (S635). If the accumulated value SLSNTI has exceeded the completion threshold value at step S627, a theoretical air-fuel ratio KBS0 is set to the target air-fuel ratio (S629) and the flag F-KBS1 is set to zero (S631). According to the above-mentioned process, on the transition from lean to stoichiometry or when returning from the fuel cut operation, occluded NOx can be reduced by setting the air-fuel ratio to KBS1 temporarily.

In addition, it is important to set to KBS1 (target air-fuel ratio for rich process on the transition from lean to stoichiometry) the value that can supply the lean NOx catalyst with sufficient HC and CO, which can reduce the NOx in the lean NOx catalyst considering cleaning by three-way catalyst (around 13.0, for example). Setting the appropriate value to KBS1 enables to prevent the drivability from degradation caused by excessive rich air-fuel ratio and to prevent the emission from deterioration caused by setting insufficient rich amount at the same time.

If it is determined that the engine runs at idle, the flag F-LB is set to zero (S623) and the basic target air-fuel ratio KBS is set to an target air-fuel ratio for idling KBSIDL (stoichiometric air-fuel ratio)(S625).

Figure 7:
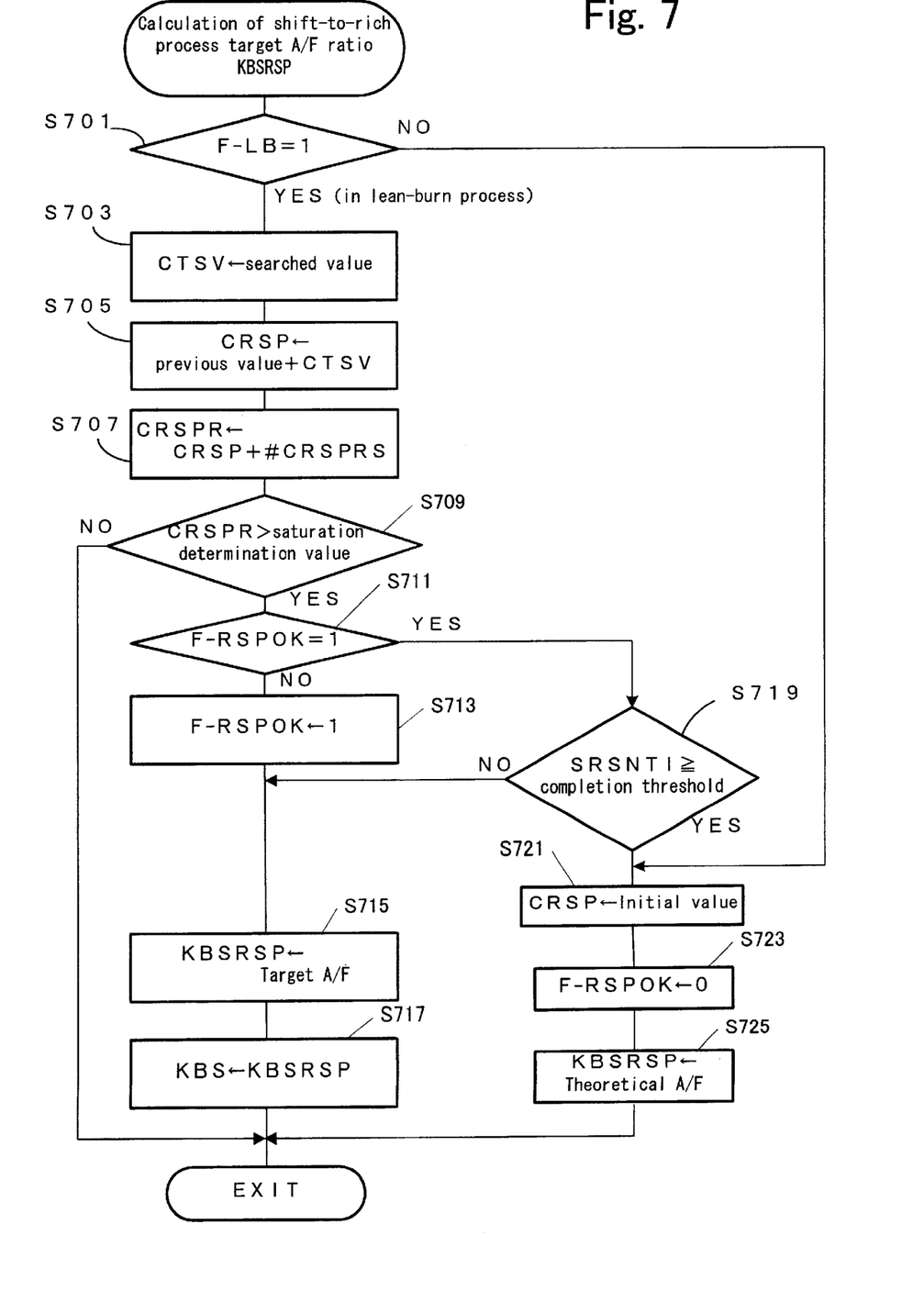
FIG. 7 is a flow chart of the process for calculating a target air-fuel ratio during the shift-to-rich process.

Calculation of Target Air-Fuel Ratio KBSRSP for Shift-to-Rich Process During Lean-Burn Operation With reference to FIG. 7, the shift-to-rich process for the air/fuel ratio during the lean-burn operation (step S205 of FIG. 2) will be described. This shift-to-rich process is performed for the purpose of temporarily changing the air/fuel ratio to the rich side during the lean-burn operation to reduce the NOx occluded by the lean NOx catalyst and to recover the cleaning functionality of the catalyst.

It is determined whether the lean-burn operation is permitted or not by checking the lean-burn permission flag F-LB (S701). If the flag is set to 1, which means that the lean-burn operation is permitted, an occluded NOx estimate value (CTSV) map is searched using, as searching parameters, the engine revolution NE and the intake pipe pressure PB which are detected by each sensor in order to obtain an occluded NOx estimate value CTSV (S703). The occluded NOx estimate value obtained in step S703 is added to the previously estimated value of the occluded NOx to produce the current value CRSP (S705). Then, the process adds the NOx amount CRSPRS, which is assumed to be occluded by the lean NOx catalyst during the lean-burn operation, is added to the current CRSP to obtain the estimated value CRSPR for the occluded NOx (S707).

It is determined whether the estimated value CRSPR for the occluded NOx exceeds a predetermined saturation determination value or not (S709). If the estimated value CRSPR does not exceed the predetermined saturation determination value, the process is terminated because no shift-to-rich process is required, and will restart the accumulation process for the estimated value of the occluded NOx in step S701 in the subsequent processing cycle. If the estimated value CRSPR exceeds the predetermined saturation determination value, the shift-to-rich process is performed in step S711 and subsequent steps.

It is determined whether the shift-to-rich process permission flag F-RSPOK is set to 1 or not (S711). If the flag is set to 0, the flag F-RSPOK is set to 1 (S713) and the air/fuel ratio KBSRSP for the shift-to-rich process is set to the shift-to-rich process target air/fuel ratio (13.0 for example) (S715). Then the KBSRSP is set to the basic target air/fuel ratio KBS depending on the operational conditions (S717).

If the lean-burn permission flag is set to 1 in step S711, the process proceeds to step S719 to determine whether the accumulated value SRSNTI of the intake air amount correlation value NTI exceeds a completion threshold value. If it does not exceed the completion threshold value, the process proceeds to step S715, where the shift-to-rich process continues. If the accumulated value for NTI exceeds the completion threshold value in step S719, the current estimated value CRSP of the occluded NOx is set to the initial value (corresponding to the NOx amount that should be occluded on the transition from rich process to lean operation) (S721), the shift-to-rich process permission flag F-RSPOK is set to 0 (S723), the KBSRSP is set to the theoretical air/fuel ratio (S725) and the process is terminated.

Although the linear air/fuel ratio sensor is used as the air/fuel ratio sensor upstream of the three-way catalyst in the above-mentioned embodiment, an O2 sensor may be used alternatively. It should be noted that although the invention has been described in conjunction with the specific embodiment, the invention is not intended to be limited to such specific embodiment.

What is claimed is:

1. An electronic control unit for controlling an air-fuel ratio of an engine having lean NOx catalyst in its exhaust system, comprising:

an estimator for estimating NOx amount occluded in the lean NOx catalyst;

means for performing shift-to-rich process on a transition from lean-burn operation to stoichiometric operation;

a calculator for calculating an accumulated value of an exhaust flow amount; and means for completing said shift-to-rich process responsive to said accumulated value of the exhaust flow amount reaching a threshold value which is set based on the occluded NOx amount estimated by said estimator;

wherein said electronic control unit controls the air-fuel ratio to reduce the lean NOx catalyst.

2. The electric control unit as claimed in claim 1, wherein said estimator estimates the occluded NOx using an air intake pipe pressure and an engine rotation.

3. The electronic control unit as claimed in claim 1, further comprising:

a three-way catalyst and an air-fuel ratio sensor upstream of said lean NOx catalyst;

wherein said calculating means starts to accumulate the exhaust flow amount when said air fuel ratio sensor indicates rich.

4. The electronic control unit as claimed in claim 3, further comprising adding means for adding NOx amount to be occluded in said lean NOx catalyst during said shift-to-rich process, to said estimated occluded NOx amount.

5. The electric control unit as claimed in claim 4, wherein said threshold value is set based on resulting value added by said adding means.

6. A method for controlling an air-fuel ratio of an engine having lean NOx catalyst in its exhaust system to reduce the lean NOx catalyst, comprising:

estimating NOx amount occluded in the lean NOx catalyst;

performing shift-to-rich process on a transition from lean-burn operation to stoichiometric operation;

calculating an accumulated value of an exhaust flow amount; and completing said shift-to-rich process responsive to said accumulated value of the exhaust flow amount reaching a threshold value which is set based on the occluded NOx amount estimated by said estimating step.

7. The method as claimed in claim 6, wherein said engine has a three-way catalyst and an air-fuel ratio sensor upstream of said lean NOx catalyst and said calculating step starts to accumulate the exhaust flow amount when said air-fuel ratio sensor indicates rich.

8. The method as claimed in claim 7, further comprising adding step for adding NOx amount to be occluded in said lean NOx catalyst during said shift-to-rich process, to said estimated occluded NOx amount.

9. The method as claimed in claim 8, wherein said threshold value is set based on resulting value added by said adding step.

10. An electronic control unit for controlling an air-fuel ratio of an engine having a three-way catalyst and a lean NOx catalyst provided in the engine exhaust system, and an air-fuel ratio sensor provided between said three-way catalyst and said lean NOx catalyst, the electronic control unit comprising:

an estimator means for estimating NOx amount occluded in the lean NOx catalyst, means for performing shift-to-rich process responsive to the NOx amount estimated by said estimator exceeding a predetermined value;

calculator means for calculating an accumulated value of an exhaust flow amount, said calculating means starting to accumulate the exhaust flow amount when said air-fuel ratio sensor indicates rich; and means for completing said shift-to-rich process responsive to said accumulated value of the exhaust flow amount exceeding a threshold value which is set based on the occluded NOx amount estimated by said estimator;

wherein said electronic control unit controls the air-fuel ratio to reduce the lean NOx catalyst.

11. The electric control unit as claimed in claim 10, wherein said estimator means estimates the occluded NOx using an air intake pipe pressure and an engine rotation.

12. The electronic control unit according to claim 10, further comprising adding means for adding NOx amount to be occluded in said lean NOx catalyst during said shift-to-rich process, to said estimated occluded NOx amount.

13. The electric control unit according to claim 10, wherein said threshold value is set based on resulting value added by said adding means.

14. A method for controlling an air-fuel ratio of an engine having a three-way catalyst and a lean NOx catalyst provided in the engine exhaust system, and an air-fuel ratio sensor provided between said three-way catalyst and said lean NOx catalyst to reduce the lean NOx catalyst, the method comprising the steps of:

estimating NOx amount occluded in the lean NOx catalyst;

performing shift-to-rich process responsive to the NOx amount estimated by said estimating step exceeding a predetermined value;

starting to calculate an accumulated value of an exhaust flow amount when said air-fuel ratio sensor indicates rich; and completing said shift-to-rich process responsive to said accumulated value of the exhaust flow amount exceeding a threshold value which is set based on the occluded NOx amount estimated by said estimator.

15. The method according to claim 14, further comprising an adding step for adding NOx amount to be occluded in said lean NOx catalyst during said shift-to-rich process, to said estimated occluded NOx amount.

16. The method according to claim 15, wherein said threshold value is set based on resulting value added by said adding step.

* * * * *